May 1, 1928.

C. HORN ET AL

VALVE

Filed Sept. 19, 1927

1,668,455

WITNESSES

INVENTOR
Carl Horn
Adam P. Horn
BY
ATTORNEYS

Patented May 1, 1928.

1,668,455

UNITED STATES PATENT OFFICE.

CARL HORN AND ADAM PHILIP HORN, OF ELMHURST, NEW YORK, N. Y.

VALVE.

Application filed September 19, 1927. Serial No. 220,438.

This invention relates to valves, and particularly to valves which may be used for spigots, as well as for general use, the object being to provide an improved construction of valve, wherein a comparatively large seat is provided at all times.

Another object of the invention is to provide an improved valve structure wherein the valve key will be reciprocated, while the operating member therefor will be rotated.

In the accompanying drawing—

Figure 1:
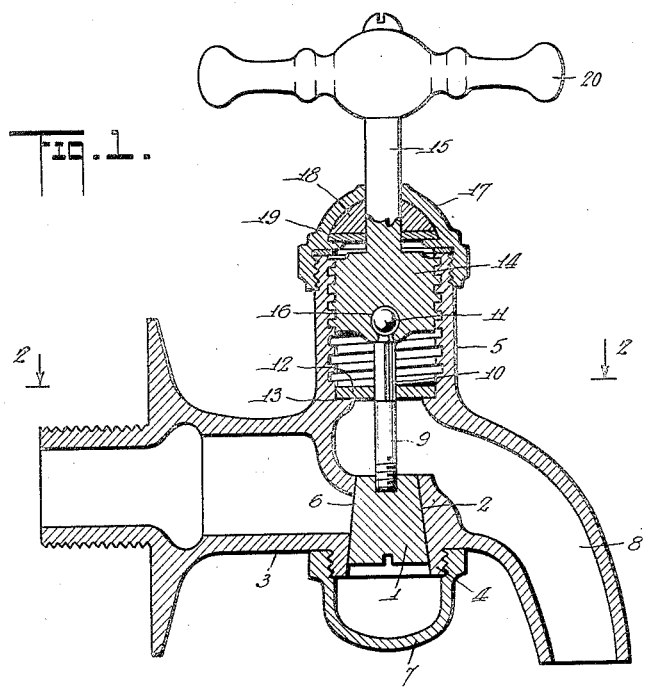
Figure 1 is a longitudinal vertical sectional view through a valve disclosing an embodiment of the invention.
Figure 2:
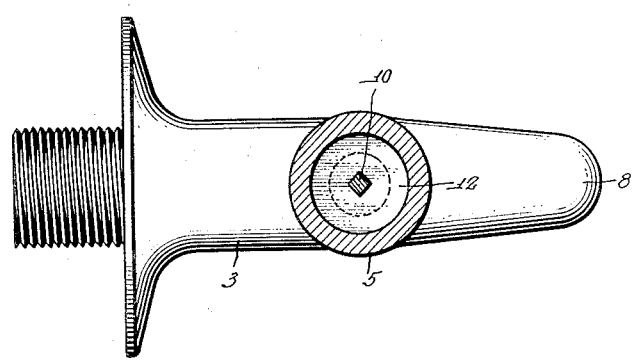
Figure 2 is a sectional view through Figure 1 on line 2—2.
Figure 3:
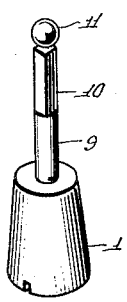
Figure 3 is a detail perspective view of the valve key and associated parts shown in Figure 1.

Referring to the accompanying drawing by numerals, 1 indicates a valve key which is circular in cross section, and which tapers from one end to the other so as to engage all parts of the seat 2 when closed. The seat 2 is formed as an integral part of the valve casing 3, which valve casing has an exteriorly threaded portion and an interiorly threaded tubular extension 5. The casing 3 may be made of any material, as for instance, brass, and the seat 2 is preferably of the same material. The key 1 may be brass, bronze or other material, and is designed to snugly fit over substantially the entire seat for closing the passage-way 6 when the key is in a closed position. A cap 7 is threaded onto the threaded extension 4, said cap permitting the seat to move downwardly to give a wide opening at the passage-way 6 without permitting the fluid to pass otherwise than through the discharge opening 8. The key 1 is provided with a threaded socket receiving the threaded end of stem 9; said stem at the upper part having a squared section 10 and a ball formation 11. The squared section 10 slidingly fits into a square opening in the guiding plate 12, which plate may be held in position in any desired manner preferably by a very tight fit in the recess 13. The threaded tubular portion 5 accommodates the exteriorly threaded enlargement 14 of the power shaft 15. The enlargement 14 is provided with a socket 16 for accommodating ball 11 which loosely fits therein, whereby as the enlargement 14 rotates with shaft 15, stem 9 is caused to move longitudinally only, without forcing a rotary movement thereon. The squared section 10 and the plate 12 prevent a rotary motion of stem 9, whereby key 1 is not rotated, thus permitting the same to re-seat in the same place. The re-seating of the key in the same place insures to a greater extent a continuous tight contact even if the parts should wear somewhat. A metal cap 17 is screwed onto the upper end of the tubular portion 5, said metal cap carrying a rubber packing 18 acted on by the spring 19, which spring acts to force the packing 18 toward shaft 15, thus producing a substantially water-tight packing. A suitable handle or knob 20 is connected to shaft 15 in any desired manner whereby when the shaft 15 is rotating in one direction, the valve will be opened, and when rotating in the opposite direction the valve will be closed. It will be noted that by reason of the ball 11 and the other features of the stem 9 and associated parts, the key 1 is merely reciprocated, while the exterior parts of the valve which are operated, rotate and reciprocate as the valve is opened and closed.

What we claim is:

1. A valve, comprising a casing formed with a tapering valve seat circular in cross section, a valve key co-acting with said valve seat, a stem for moving said valve key longitudinally into and out of engagement with said seat, said stem having a squared section and a ball-shaped end, means engaging the squared section for preventing the stem from rotating, and a hand operated rotatable member continually interlocking with said ball-shaped end for moving said stem longitudinally so as to cause said valve key to move into and out of engagement with said valve seat.

2. A valve, comprising a casing having a valve seat tapering from one end to the other and circular in cross section, said valve seat extending to the exterior through one portion of the casing, a removable cap covering said valve seat at one end, a valve key coacting with said valve seat, a stem for actuating said valve key, said casing being provided with an internally threaded tubular extension in line with said valve seat, said stem extending into said extension, a member threaded into said extension engaging said stem for moving the stem longitudinally, and a hand operated member for actuating said threaded member.

3. A valve, comprising a casing having a tapering valve seat circular in cross section and an internally threaded tubular extension arranged in line with said valve seat, a tapering valve key adapted to be moved into and out of engagement with said seat, a stem extending from said valve key, said stem having a square section, a guide carried by the tubular extension, said guide being formed with a square opening engaging said square section for permitting said stem to move longitudinally without rotating, and hand operated means threaded in said extension and engaging one end of said stem for moving the stem longitudinally.

4. In a valve, a reciprocating valve key, a stem for actuating said key, said stem having a square section, means engaging said square section for guiding the stem so as to permit the stem to move longitudinally without rotating, said stem at one end having a ball-shaped terminal, a rotating member formed with means partly enclosing said ball-shaped terminal, and manually actuated means for rotating said rotatable means whereby said stem is moved longitudinally without rotating for causing said key to move into a closed and an open position.

Signed at New York, in the county of New York and State of New York this 16th day of September A. D. 1927.

CARL HORN.
ADAM PHILIP HORN.